United States Patent [19]

Aste

[11] 4,018,520

[45] Apr. 19, 1977

[54] PROJECTOR FOCUSING MECHANISM

[75] Inventor: Fortunato Aste, Sint Niklaas, Belgium

[73] Assignee: GAF Corporation, New York, N.Y.

[22] Filed: Apr. 15, 1975

[21] Appl. No.: 568,155

[52] U.S. Cl. .............................. 353/101; 350/255; 352/140; 355/55
[51] Int. Cl.² .................... G03B 3/00; G03B 21/14; G02B 7/02
[58] Field of Search .................... 353/101; 352/140; 355/55; 354/25; 350/255

[56] References Cited

UNITED STATES PATENTS

| 3,071,041 | 1/1963 | Walter | 353/101 |
| 3,349,667 | 10/1967 | Levin et al. | 353/101 |
| 3,496,851 | 2/1970 | Himmelsbach | 350/255 |
| 3,712,725 | 1/1973 | Eckerdt | 353/101 |
| 3,861,794 | 1/1975 | Sobotta | 353/101 |

FOREIGN PATENTS OR APPLICATIONS

| 1,933,521 | 7/1969 | Germany |
| 1,081,249 | 5/1960 | Germany |
| 920,850 | 3/1963 | United Kingdom |
| 922,711 | 4/1963 | United Kingdom |
| 922,712 | 4/1963 | United Kingdom |
| 1,047,966 | 11/1966 | United Kingdom |

*Primary Examiner*—Steven L. Stephan
*Attorney, Agent, or Firm*—Walter C. Kehm; Arthur Dresner

[57] ABSTRACT

The present invention is directed to a transparency projector, such as a slide or motion picture projector including a compact focusing mechanism having an objective lens carried within a lens barrel supported within a sleeve which is carried within the projector housing for axial reciprocal displacement along the optical axis. The sleeve is provided with means for engaging a guide rod supported within the projector housing for limiting movement of the sleeve to axial movement. A reversible electric motor is supported on the sleeve for movement therewith and is energized in response to slide position error signals received from an automatic focusing system of the type well known in the art. The electric motor operates to drive a disc rotatably carried on the sleeve. The disc is provided with a spiral groove on one face. A pin fixedly supported on the projector housing is arranged for engagement with the spiral groove so that upon rotation of the disc, engagement of the pin within the spiral will produce axial movement of the lens barrel supporting sleeve along the guide rod.

4 Claims, 7 Drawing Figures

PROJECTOR FOCUSING MECHANISM

BACKGROUND OF THE INVENTION

The present invention relates generally to the field of photographic projection devices such as motion picture projectors or slide transparency projectors, and is more specifically directed to the arrangement within such projectors for producing automatic focusing of the transparency image on a remote viewing screen.

The use of automatic focusing systems for causing movement of a projection (objective) lens along the optical axis in either motion picture projectors or slide transparency type projectors are well known in the art. Typical in such arrangements are the provision of an objective lens carried within a lens barrel, the barrel being mounted for axial movement within a sleeve which is also arranged for axial movement along the optical axis. In automatic focusing systems means are provided for detecting variations in the distance between the objective lens carried within the barrel and the projection screen, and between the transparency and the objective lens. Sampling beams of light are typiclly provided so as to be reflected from the screen and or the transparency upon detection means frequently carried on the sleeve. The detection devices generate electrical signals responsive to displacement in such sampling beams in order to drive motive means for causing axial displacement of either the objective lens or the lens sleeve. Such axial displacement is effected in order to correct errors in the distances between the objective lens and the transparency so that proper focusing can be automatically effected. One such example of this type of automatic focusing mechanism may be found in U.S. Pat. No. 3,813,155.

The motive means for causing axial displacement of the objective lens, in response to detection error signals indicating need for displacement to effect automatic focusing, may be found by a variety of arrangements. One such arrangement, shown in the above mentioned patent, involves the use of a lens barrel mounted within a sleeve which is carried on the projector housing for axial reciprocal movement. The sleeve carries an axially extending gear rack for meshing engagement with a pinion gear which is driven by a shaft of a reversible electric motor, which is also mounted on the housing of the projector. Energization of the motor will cause the pinion to drive the rack thus producing axial reciprocal movement of the lens barrel sleeve. This type of arrangement, while relatively simple, has the disadvantage of requiring a large amount of space within the projector necessitating larger housings and costlier assembly procedures.

Other arrangements for effecting focusing adjustment of the objective lens by automatic focusing systems have involved the use of a lens carrying sleeve and a pin eccentrically mounted on a rotatable disc or on a pivotable lever and engageable with following means on the sleeve. The lens adjustment mechanism typically includes a pin or lug eccentrically mounted on a rotatable disc. A recess or groove in the sleeve carrying the lens for receiving the pin or lug forms the following means. Upon rotational movement of the disc, consequent eccentric movement of the pin or lug will cause axial displacement of the lens sleeve so as to effect the desired focusing. This type of arrangement also suffers from similar disadvantages as the previous described arrangement.

Another known device for producing axial displacement of the lens sleeve is shown and described in German Auslegeschrift 1,081,249 published on May 5, 1960. This arrangement provides for the lens sleeve to be connected with a curvilinear guide arranged for movement within the projector housing which in turn is driven by a reversible motor mounted on the projector housing. The curvilinear guides provided in this arrangement may be spiral grooves formed on two discs arranged for supporting opposite sides of the lens sleeve. A pin carried by the sleeve is arranged for engagement with the grooves, so that upon rotational driving of the discs, axial displacement of the lens sleeve will result. This arrangement has the advantage of utilizing a reduced ratio of the drive movement but still suffers the same disadvantages as the previous described arrangements.

It is accordingly one object of the present invention to provide a driving mechanism for producing axial reciprocal displacement of the objective lens carrier or sleeve in order to effect automatic focusing which overcomes the disadvantages of the prior art arrangements.

It is a further specific object of the present invention to provide in a slide or motion picture projector apparatus a compact and space-saving arrangement for effecting automatic focusing by movement of the objective lens carrier.

Yet, another object of the present invention is the provision of a focusing system in which the motive means for causing desired axial displacement of the objective lens is produced by a compact arrangement in which the reversible drive motor is carried directly on the sleeve for translating rotational movement thereof to axial movement of the sleeve to effect desired focusing.

The above objects, features and advantages, along with other objects, features and advantages, of the present invention will become more apparent from the detailed description of the invention, in conjunction with the accompanying drawings to be described more fully hereinafter.

SUMMARY OF THE INVENTION

The foregoing objects are generally achieved by providing in a transparency projector, the combination comprising a housing, a projection gate within said housing for supporting therein a transparency having an image to be projected upon a remote viewing screen, a source of illumination, within the housing, optical means including an objective lens carried in a lens barrel for projecting said image, a lens barrel carrier mounted for axial movement within said housing, said lens barrel being axially moveable within said carrier, and means carried by said carrier for causing said axial movement thereof to effect focusing adjustment of said transparency image on said remote viewing screen.

Specifically, the arrangement provides for a compact focusing mechanism of the type described, having an objective lens carried within a lens barrel supported within a lens barrel carrier. The lens barrel carrier is formed by a cylindrical sleeve which is mounted within the projector housing for axial reciprocal displacement along the optical axis. The sleeve is provided with means for engaging a guide rod supported within the projector housing for limiting movement of the sleeve to axial movement. A reversible electric motor is supported on the sleeve for movement therewith and is energized in response to slide position error signals received from an automatic focusing system of the type well known in the art. The electric motor carries a threaded shaft or worm which engages a gear ring rotatably carried on the sleeve. The gear ring is supported by a disc mounted for rotation on the sleeve and carries a spiral groove on its face. A pin fixedly supported on the projector housing is arranged for engagement with the spiral groove so that upon rotation of the disc, produced by driving engagement with the motor shaft, engagement of the pin within the spiral will produce axial movement of the lens carrier or sleeve along the guide rod. The duration and direction of energization of the reversible motor for driving the spiral disc is determined by the automatic focusing system and the signals produced thereby.

The foregoing and other features of the focusing drive mechanism of the present invention are more fully described with reference to the annexed drawings.

BRIEF DESCRIPTION OF THE DRAWINGS

There follows a detailed description of a preferred embodiment of the invention to be read together with the accompanying drawings wherein.

DESCRIPTION OF THE INVENTION

For purposes of illustration, the present invention is shown and described as embodied in a photographic slide projector. However, it will be understood by those skilled in the art that the invention is not to be limited for use with such slide projectors, and may be utilized with other projection devices, such as motion picture projectors or the like.

Figure 1:
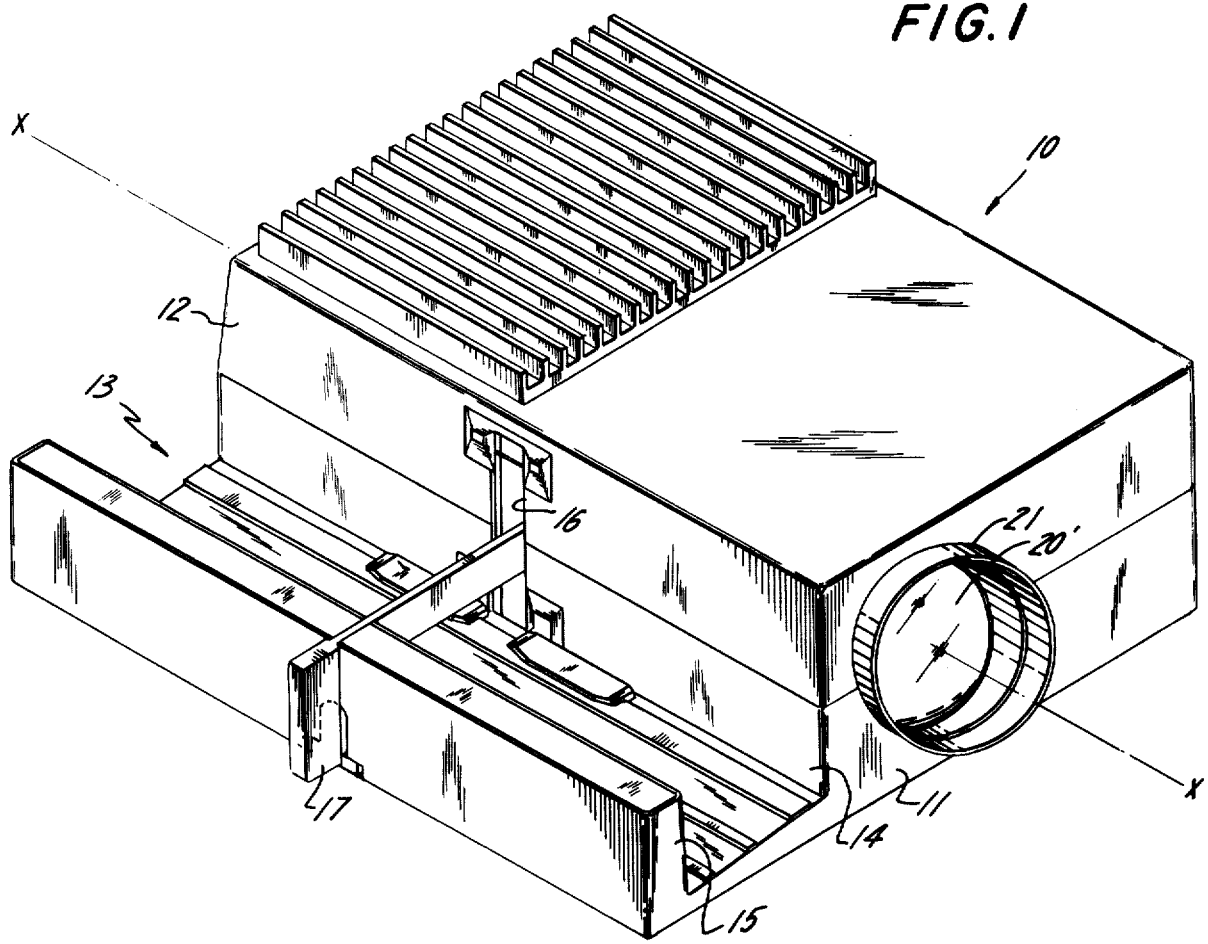
FIG. 1 is a perspective view of a slide projection device in which the present invention may be incorporated.

Referring now in more detail to the accompanying drawings, FIG. 1 shows a projection device of the type in which the present invention may be utilized. The projection device shown herein is a slide projector, identified generally as reference numeral 10 having a bottom housing 11 and a top cover 12. The bottom housing 11 is provided with a slide tray receiving groove 13 defined by inner opposite facing walls 14 and 15 which extend longitudinally along opposite sides of the groove so that the groove is open at the top, front and rear ends for receiving slide trays which carry or store slide transparencies for sequential viewing upon a remote projection screen. The projector shown herein is of the type adapted to accommodate trays of different configurations, such as the well known box-type tray or rotary or circular type tray.

The optical axis of the projector is indicated by a broken line X—X. In a manner well known in the art, a lamp and condenser lens system (described more fully hereinafter and with reference to FIGS. 2 and 7) is provided for projecting the image, carried on a transparency through the objective lenses 20 and 20' onto a remote viewing screen. The lamp and condenser lens system with the objective lens and focusing mechanism form the optical system to be described more fully hereinafter.

In a well known manner, a vertically extending slide receiving aperture 16 is formed in the wall 14 of the bottom housing of the slide receiving groove 13 and in the top cover approximately midway between the front and rear walls of the projector housing and top cover, to permit transfer of slides from one of the interchangeable slide trays disposed within the tray receiving groove 13 to a viewing position (projection gate) in the projector and for the return of the slides from the viewing position to the slide tray.

A slide carrier 17 is mounted for reciprocal sliding movement transversely of the optical axis X—X and is adapted for transferring slides between a slide tray disposed in the groove 13 and the viewing aperture 16 in the projector. Further details of the slide carrier 17 and of the operation thereof for either manually or automatically advancing slides carried in a slide tray disposed within said groove to the viewing position is not described herein as such details form no part of the present invention.

When a slide is caused to be inserted through the aperture 16 into the viewing position 18 (see FIG. 2), by the slide carrier 17 the automatic focusing adjusting system, such as described in the aforesaid U.S. Pat. No. 3,813,155, will become operative to determine whether focusing adjustment of the objective lenses 20 and 20' is necessary in order to correct focus of the image upon the remote viewing screen. If such adjustment is required, an electrical error signal is produced by the adjusting system to operate the focusing mechanism.

Figure 2:
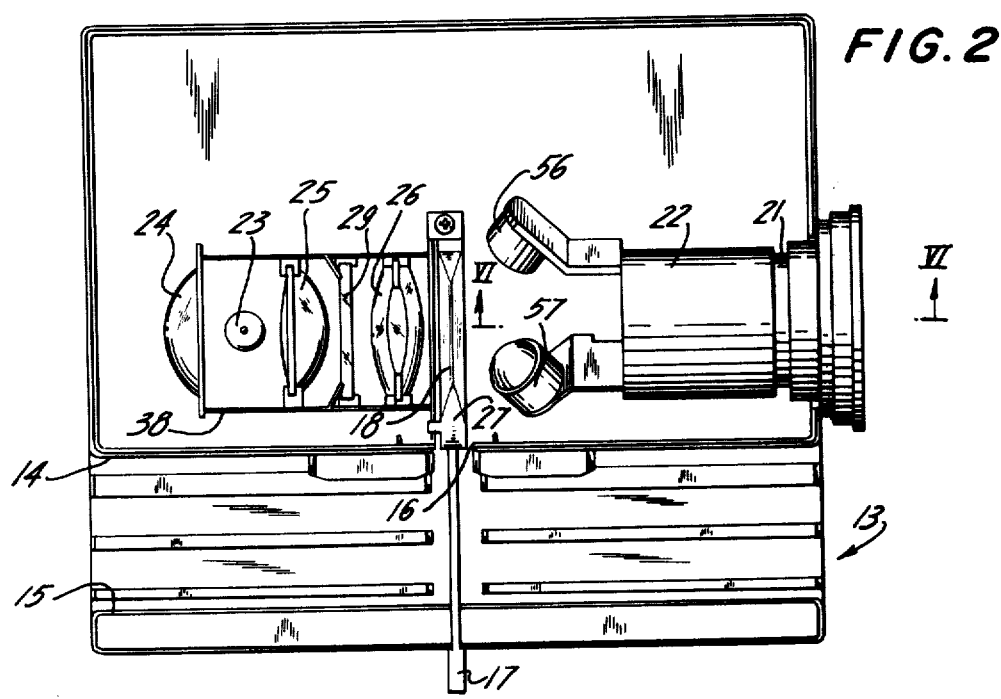
FIG. 2 is a top plan view of the projector device shown in FIG. 1 with the top cover thereof removed and showing details of the optical system of the projector.
Figure 7:
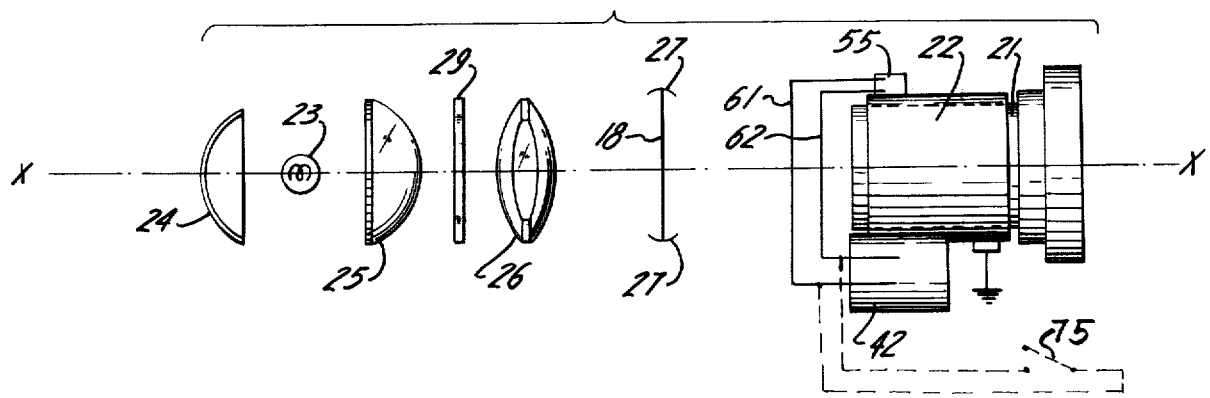
FIG. 7 is a schematic view of the optical system.

FIGS. 2 and 7 show the various elements of the optical system which are conventional in a photographic slide projector and which is seen to include a projection bulb 23, a reflector 24 and a lens 25 for projecting light along the projector optical axis X—X. Another lens 26 includes the usual heat filter for removing infrared energy to cool the radiation used for projection. Additional filter means 29 may also be provided. The foregoing structure is preferably carried by a support 38.

A projection gate 18, defining the viewing position, for a slide transferred by the carrier 17 from a slide tray within the slide groove 13, is formed by slide positioning elements in the form of a pair of rails 27 for holding the slide transparency in a plane perpendicular to the optical axis.

The objective lenses 20 and 20' are carried in a lens barrel 21 which is mounted for sliding, telescoping or screw type movement within sleeve 22 and may be manually manipulated to move the barrel 21 axially along the optical axis relative to sleeve 22 to achieve manual focusing if desired.

The lens barrel 21 is provided with helically arranged grooves 19 about its periphery. A detent 28 carried on a spring arm 28' mounted on the sleeve 22 extends through an opening 28" in the sleeve for engagement with the grooves 19 on the barrel so that the barrel may either be rotated to produce axial movement within the sleeve as a result of the detent engaging the grooves, or may be telescopingly moved within the sleeve, the detent being removed from the grooves as a result of manual manipulation of the barrel within the sleeve. In this manner, manual focusing of the objective lens may be accomplished by movement of the lens barrel 21 axially within the sleeve 22.

Automatic focusing in order to correct errors in the distances between the slide transparency supported in the projection gate and the objective lens, or the difference between the lens and the screen is accomplished by axial movement of the sleeve itself rather than the lens barrel within the sleeve. The present invention is specifically directed to the arrangement for effecting axial movement of the sleeve in order to accomplish such automatic focusing.

Figure 3:
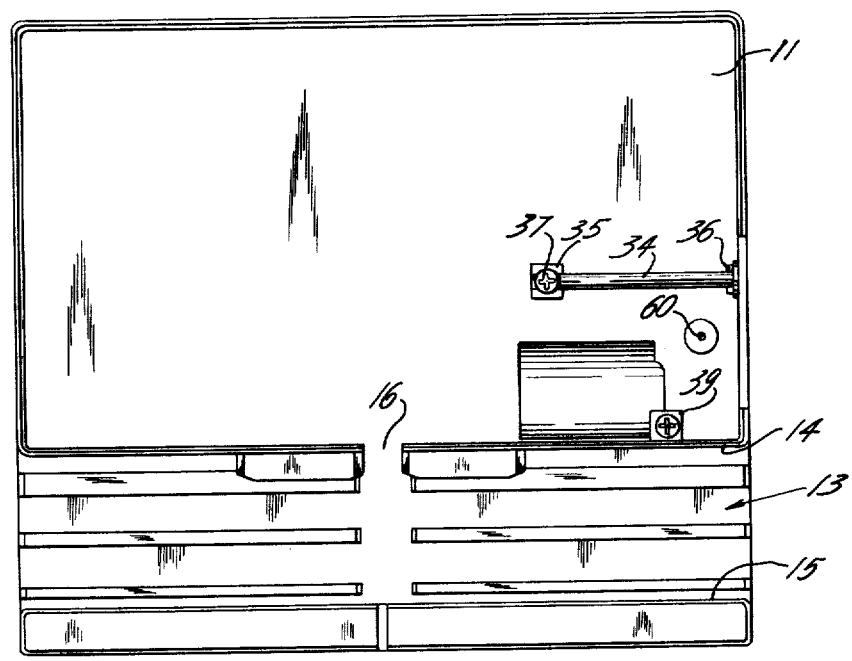
FIG. 3 is a top plan view of the projection device shown in FIG. 1 with the cover removed and showing only the details of the lens sleeve supporting and guide structure carried on the lower portion of the projector housing.
Figure 4:
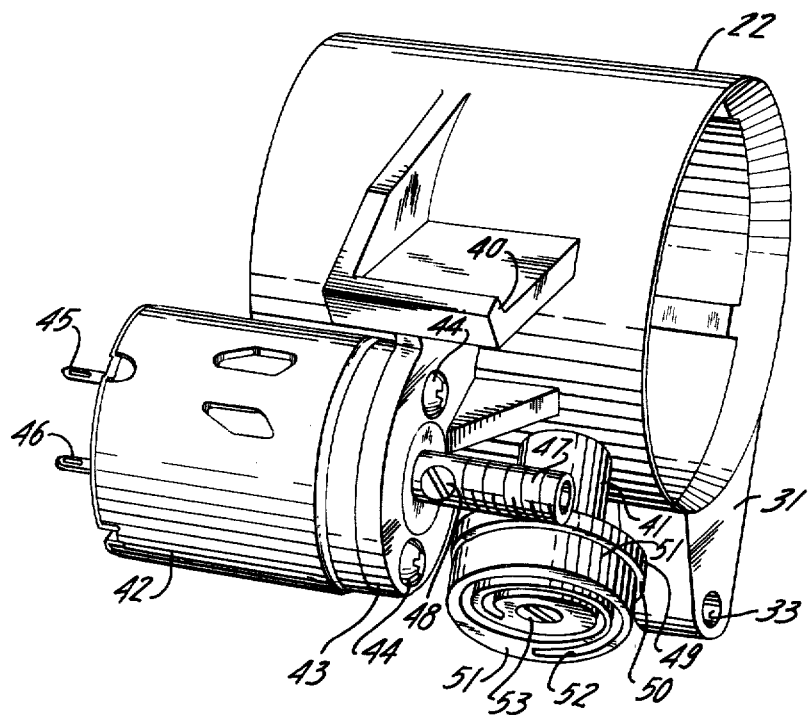
FIG. 4 is a bottom perspective view of the lens sleeve with reversible electrical motor and spiral groove disc supported thereon, all removed from the housing.
Figure 5:
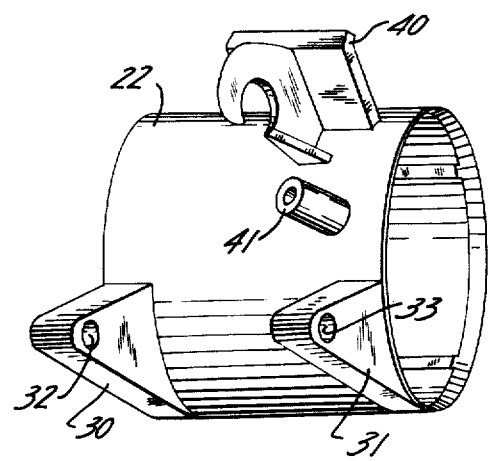
FIG. 5 is a bottom perspective view of the lens barrel sleeve.
Figure 6:
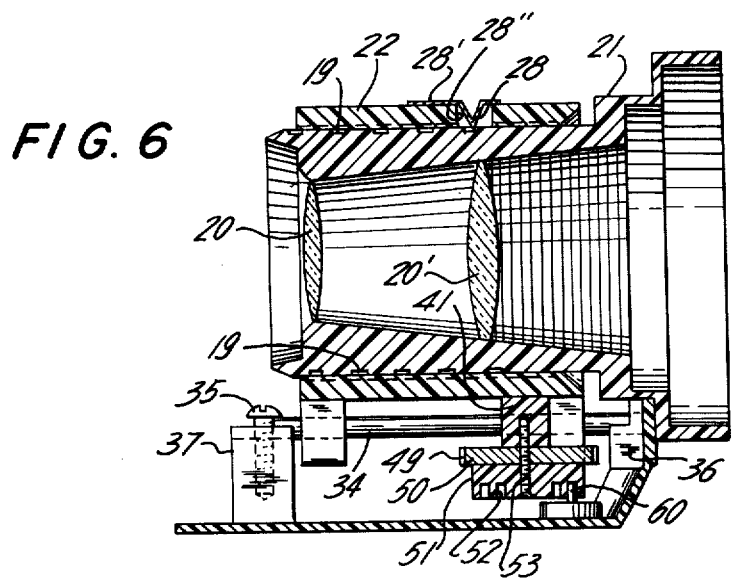
FIG. 6 is a sectional view taken along lines VI—VI of FIG. 2.

The sleeve 22 for accommodating the lens barrel is provided with arms 30 and 31 (See FIG. 5) extending from the peripheral surface thereof. Arms 30 and 31 have guide apertures 32 and 33 respectively. The sleeve is supported and guided for axial movement on a guide rod 34, passing through apertures 32 and 33. The rod 34 is mounted within the lower housing 11 upon support blocks 37 and 36. Means such as screw 35 may be provided for engagement with one of the supports, such as support 37 shown in FIG. 3, so as to facilitate assembly and removal of the guide rod 34 from the housing. A guide support 39 is also mounted in the bottom housing 11 of the projector for engagement with a guide flange 40 carried by the sleeve 22. The guide flange 40 is supported on a peripheral surface of the sleeve and extends for approximately half the distance of the total length of the sleeve. Guide support 39 is further provided with means for retaining the guide flange on the support such as by a groove or screw retaining element. The retaining means of guide support 39 prevents any rotational movement of the sleeve 22 about the optical axis while constraining the sleeve to move in an axial direction only. Guide rod 34 passing through guide apertures 32 and 33 performs a similar function on the other side of the sleeve.

A reversible electric motor 42 is carried on the sleeve by attachment of one end thereof to a flange 43 extending from the peripheral surface of the sleeve in a direction substantially perpendicular to the optical axis. Retaining means such as screws 44 are used for supporting the motor on the flange 43. Motor 42 is provided with terminals 45 and 46 for connection to the output of the automatic focusing system thus producing electrical signals for energizing the motor 42. A worm gear 47 is carried on the output shaft of the motor 42 by set screw 48. The worm gear 47 extends in a longitudinal direction parallel to the optical axis. A gear 49 is carried on the periphery of a disc 50 which is mounted for rotatable movement on an extension 41 carried by the sleeve 22. The disc 50 can be provided with a spiral groove on one face thereof or, preferably, as shown herein; disc 50 carries a separate disc 51 which is provided with spiral grooves 52. Discs 50 and 51 are secured to the sleeve 22 for rotation together by means of screw 53.

The gear and disc 49, 50 with spirally grooved disc 51 is carried on the extension 41 in such a position that the worm 47 engages the gear 49 so as to cause rotational movement of the spiral disc upon energization of motor 42.

When the sleeve 22 is supported within the bottom housing 11 upon guide rod 34 so that guide flange 40 is fixed on guide support 39, the spiral groove 52, formed in the outward face of disc 51, will be engaged by an upstanding projection such as pin or lug 60 fixedly secured to the inner surface of bottom housing 11.

In operation, when the automatic focusing system, indicated schematically as 55 in FIG. 7 and which may include in part a light emitting element 56 and a detecting means 57 for detection of displacements in the sampling beam produced by element 56, an electrical error signal will be produced to indicate whether focusing adjustment is required. A proportional signal will be fed to the electric motor 42 through leads 61 and 62 to terminals 45 and 46. If energized by this signal, the motor will drive worm 47 so as to cause rotational movement of the gear 49 and consequently of the spiral disc 51. As a result of fixed pin 60 engaging and guided in the spiral groove 52, rotational movement of the disc will be translated into axial movement of the sleeve along guide rod 34. The direction of axial movement to effect desired focusing will depend upon the polarity of the electrical pulse received by the reversible electric motor 42.

An alternative means for energizing motor 42 to effect focusing by axial displacement of the sleeve 22 is to provide a remote control switch 75 (shown schematically in dotted lines in FIG. 7) connected across the input terminals of the motor. Such remote control switch is typically carried on a hand held remote control panel for use by the operator of the projector.

It will be noted that because the reversible electric motor 42 is carried by the sleeve itself a very compact arrangement is provided for effecting desired axial movement of the sleeve 22 to provide desired focus adjustment. This is a distinct advantage over the known prior systems in which the electric motor is typically mounted within the projector housing requiring mounting provision and transmission means for driving the sleeve. Additionally, the spiral groove carried on the disc 50 in cooperation with pin 60 provides direct drive to the sleeve.

While the present invention is described with reference to the slide projector 10 it will be appreciated by those skilled in the art that such an arrangement can be provided in any optical projection system, and while the invention has been described and illustrated with respect to only this preferred embodiment, which gives satisfactory results, it will be understood after appreciating the purpose of the invention, that various other changes and modifications may be made without departing from the spirit and scope of the invention.

What is claimed is:

1. In a transparency projector, the combination comprising a housing, a projection gate within said housing for supporting therein a transparency having an image to be projected upon a remote viewing screen, a source of illumination within the housing, optical means including an objective lens carried in a lens barrel for projecting said image, a lens barrel carrier formed by a cylindrical sleeve mounted for axial movement within said housing, said lens barrel being axially moveable within said sleeve, and means for causing axial movement of said sleeve and thereby said lens barrel to effect focusing adjustment of said transparency image on said remote viewing screen, said means for causing axial movement of said sleeve comprising a reversible electric motor mounted on flange means integral with said sleeve, a driving element carried on the output shaft of said reversible electric motor, a single disc rotatably mounted on said sleeve in driving engagement with said driving element for causing rotation of said disc upon energization of said motor, said disc having a first flat surface facing an external surface of said sleeve and a second flat surface facing away from said external surface of said sleeve, a spiral grooved guideway arranged on said second flat surface of said disc, a stationary pin secured at one end thereof to the interior of said housing and extending toward said sleeve, the distal end of said pin being engaged in said spiral grooved guideway, cooperating guide means carried by said sleeve and said housing for restricting movement of said sleeve to axial movement along the optical axis of said lens barrel, means for energizing said motor when focusing adjustment is desired, whereby upon energization of said motor said disc will be caused to rotate with said pin guided in said spiral groove thus causing said sleeve to be axially displaced along said lens barrel optical axis by constraint of said guide means to effect focusing adjustment, and means mounted on said housing for limiting axial displacement of said sleeve.

2. The projector according to claim 1 wherein said means for energizing said motor comprises means for detecting the relative position of said objective lens to determine an out of focus condition, means connected with said position detecting means for producing an error signal when said position detecting means indicates said transparency image is out of focus on said screen, and electrical connection means connecting said error signal producing means with electrical input means of said electrical motor so that said motor will be energized to effect axial adjustment of said sleeve by a distance proportional to said error signal for automatic focusing adjustment.

3. The projector according to claim 1 wherein said guide means comprises a guide groove carried on said projector housing and a guide flange mounted on said sleeve being offset from the peripheral surface thereof and extending in a longitudinal direction for engagement with said guide groove.

4. The projector according to claim 1 wherein said guide means comprises a guide rod releasably mounted on said housing, said rod extending in a direction parallel to the optical axis of said objective lens, a pair of arms extending from the peripheral surface of said sleeve transverse to said optical axis, and guide apertures in each of said arms for supporting therethrough said guide rod.

* * * * *